United States Patent
Syed et al.

(10) Patent No.: US 10,735,944 B2
(45) Date of Patent: Aug. 4, 2020

(54) FRAMEWORK FOR ESIM PROFILE MANAGEMENT

(71) Applicant: T-Mobile USA, Inc., Bellevue, WA (US)

(72) Inventors: Hamza Hydri Syed, Bothell, WA (US); Mehul Shah, Sammamish, WA (US); Nilesh Ranjan, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 144 days.

(21) Appl. No.: 15/716,402

(22) Filed: Sep. 26, 2017

(65) Prior Publication Data

US 2019/0098488 A1    Mar. 28, 2019

(51) Int. Cl.
| | |
|---|---|
| *H04W 8/18* | (2009.01) |
| *H04L 29/08* | (2006.01) |
| *H04W 4/70* | (2018.01) |
| *G06F 16/27* | (2019.01) |
| *H04W 4/50* | (2018.01) |
| *H04W 8/26* | (2009.01) |

(52) U.S. Cl.
CPC ........... *H04W 8/186* (2013.01); *G06F 16/27* (2019.01); *H04L 67/1014* (2013.01); *H04L 67/306* (2013.01); *H04W 4/50* (2018.02); *H04W 4/70* (2018.02); *H04W 8/183* (2013.01); *H04L 67/303* (2013.01); *H04W 8/265* (2013.01)

(58) Field of Classification Search
None
See application file for complete search history.

(56) References Cited

U.S. PATENT DOCUMENTS

| | | | |
|---|---|---|---|
| 9,419,970 B2 | 8/2016 | Haggerty et al. | |
| 9,949,111 B2 * | 4/2018 | Wane | H04W 4/50 |
| 10,244,384 B2 * | 3/2019 | Park | H04W 8/205 |
| 2012/0108295 A1 * | 5/2012 | Schell | H04W 8/265 |
| | | | 455/558 |
| 2016/0020802 A1 * | 1/2016 | Lee | H04W 12/06 |
| | | | 455/558 |
| 2016/0142906 A1 * | 5/2016 | Park | H04W 8/205 |
| | | | 455/419 |
| 2016/0295544 A1 * | 10/2016 | Jiang | H04L 5/0053 |
| 2017/0048713 A1 | 2/2017 | Guday et al. | |

(Continued)

FOREIGN PATENT DOCUMENTS

| | | |
|---|---|---|
| EP | 3010263 A1 | 4/2016 |
| KR | 20170077489 | 7/2017 |

OTHER PUBLICATIONS

PCT Search Report and Written Opinion dated Jan. 14, 2019 for PCT Application No. PCT/US2018/051305, 12 pages.

*Primary Examiner* — Donald L Mills
(74) *Attorney, Agent, or Firm* — Lee & Hayes, P.C.

(57) ABSTRACT

An eSIM management framework can serve as an abstraction layer between various partners, mobile network operators, mobile-virtual network operators, and/or enterprises and SIM or eSIM vendors. The eSIM management framework can facilitate real-time SIM and/or eSIM profile provisioning to reduce consumption of network resources. In some examples, an eSIM management framework can facilitate just-in-time client-side provisioning, which can include on-demand generation of an appropriate SIM or eSIM profile.

20 Claims, 5 Drawing Sheets

(56) References Cited

U.S. PATENT DOCUMENTS

| | | |
|---|---|---|
| 2017/0142121 A1 | 5/2017 | Lee et al. |
| 2017/0171742 A1* | 6/2017 | Yang .................... H04W 8/245 |
| 2017/0289788 A1* | 10/2017 | Lalwaney ........... H04L 41/0803 |
| 2017/0332274 A1* | 11/2017 | Link, II ................. H04W 76/11 |
| 2018/0014184 A1* | 1/2018 | Schell ................... H04W 8/265 |
| 2018/0270363 A1* | 9/2018 | Guday .............. H04M 15/8083 |

* cited by examiner

FRAMEWORK FOR ESIM PROFILE MANAGEMENT

BACKGROUND

A number of various telecommunication service providers are available for the multitude of devices are now capable of accessing one or more networks for a wide variety of reasons. Cellular devices such as, for example, smart phones, tablet computers, laptop computers, and smart watches can use subscriber identification module (SIM) cards or an electronic subscriber identification module (eSIM) to access cellular and internet protocol (IP) networks to provide voice, data, messaging, and other services. Other devices, such as smart power or water meters, parking meters, automobiles, and pet trackers, for example, can also be connected to various data networks to provide reporting, receive updates, etc. Indeed, the so-called "Internet of Things" ("IoT") can include any number of internet-connected devices such as thermostats, water heaters, refrigerators, and other everyday devices configured to access any number of cellular and IP networks for updates, support, remote control services, and other purposes. Currently, vendors of SIM cards or eSIM profiles have complete control over the SIM life cycle and management of the SIM life cycle. In addition, partners who need SIMs to do a certain job currently have to integrate with a particular SIM vendor. A single vendor providing services to the network can lead to supply, distribution, and pricing concerns.

Traditionally, there have been two categories of network profiles—machine-to-machine (or, "M2M") and consumer. M2M includes devices like the aforementioned parking meters, smart power meters, thermostats, pet trackers, etc. Consumer devices, on the other hand, include cellular phones, smart phones, and tablet and laptop computers, among other things. Thus, an M2M device, including an M2M network profile, is typically given limited access, e.g., to data and short message service (SMS), for example, while a consumer device, including a consumer network profile, is typically given more extensive access to voice, SMS, data, and other features on the network.

Conventionally, SIM cards are configured as warm SIMs; that is, they are pre-loaded on a billing system and their information is stored in network databases including an over-the-air (OTA) database, an authentication and cyphering (AUC) database, and a home location register (HLR) with enough information to allow voice or data access to the network. Then, the SIMs are inserted into devices and shipped to users or stores so that every device—phone, tablet, watch—is given to a user with a SIM card to allow users to activate the device by calling customer care. Thus, conventionally, all SIMs must be able to authenticate and make calls on the network before devices are shipped. Conventionally, SIM profiles of any type must be ordered in bulk—by the tens of thousands—months in advance, and millions of profiles are loaded on the network in advance, which leads to expensive waste of network memory for extended periods of time before those SIM profiles are actually put into use. Memory databases store the SIM information in real time in memory databases, which are expensive to install and maintain as they are site and geo-redundant with data replication between sites. Meanwhile, many SIM profiles are stored unused for years, and the ratio of active accounts to warm SIMs can be less than 0.3-0.4. With the advent of eSIM and profiles that can be loaded onto devices remotely, a more efficient process can be designed. There is a need for a more efficient process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
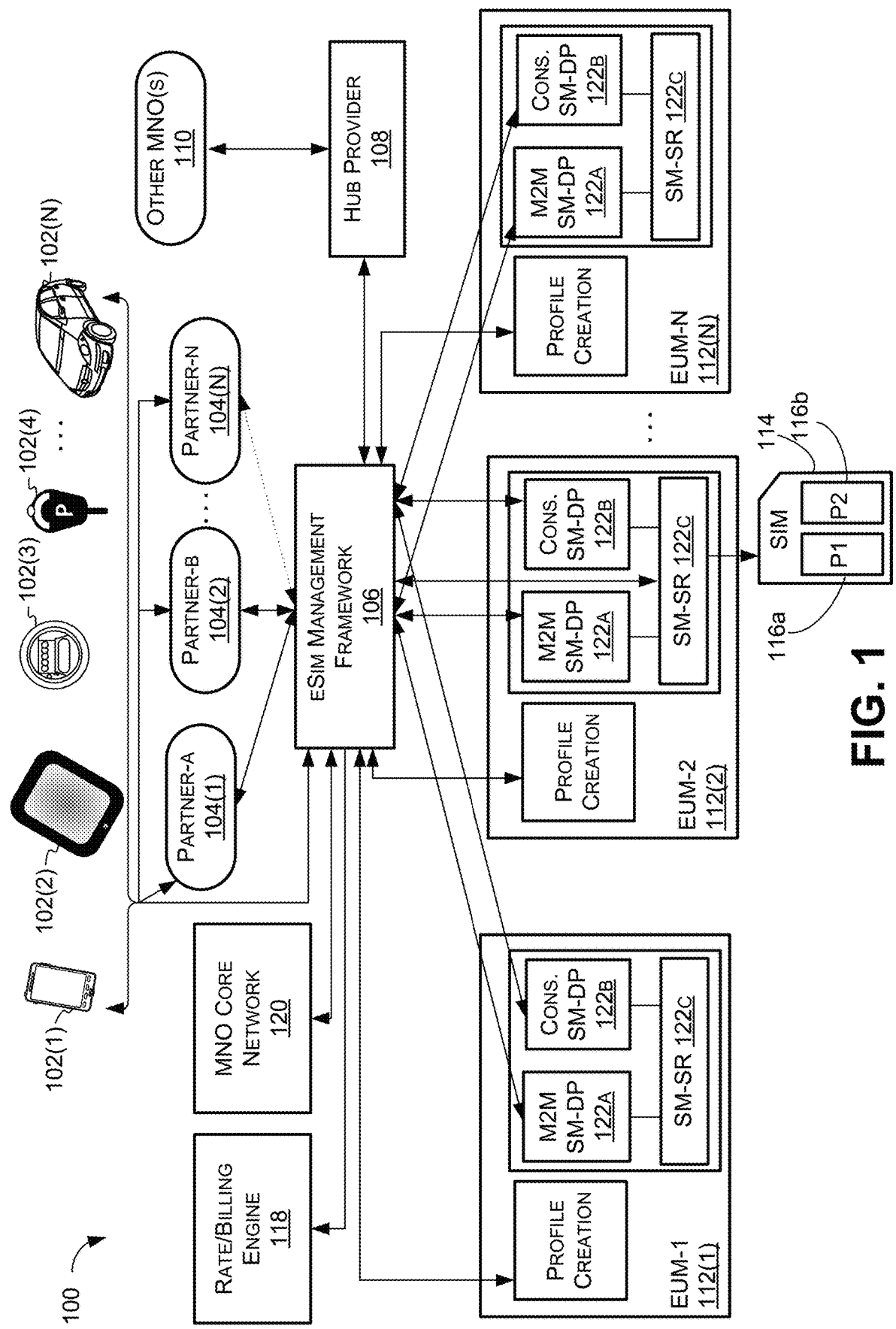
FIG. 1 depicts an environment including an electronic subscriber identification module (eSIM) management framework system with improved profile management, according to some examples described herein.

Examples described herein can include systems and methods to provide improved SIM and/or eSIM profile management, based on user preferences, device capabilities, or a combination thereof. The system described herein can relieve clients from concern related to SIM or eSIM manufacturing problems or distribution problems, and can improve pricing by removing or loosening vendor integration. Thus, the system described herein can also provide for a significant reduction in the use of network memory in contrast to the conventional approach in which network memory represents a significant expense because it is real time, site redundant, and geo redundant. Moreover, the system described herein can also provide for a significant reduction in the use of network bandwidth in contrast to the conventional approach because it can reduce or omit the need for maintenance of the conventional network memory system for inactive SIM and eSIM profiles.

In examples, the system can support provisioning SIM or eSIM profiles when the client requests are incomplete according to the Global System for Mobile communications Association (GSMA) standard. For example, typically the GSMA standard requires values for particular variables in profile requests. In contrast, a system employing an eSIM management framework as described herein supports a client simply requesting a profile, and based on available criteria such as embedded Universal Integrated Circuit Card (eUICC) number or electronic identification (EID) card number, device type, device identification (ID), and/or default criteria, the system can ascertain the likelihood that the client desires a particular type of profile and provide that type of profile.

In some examples, variables can include a partner identification variable and/or other variables outside of those required by the Global System for Mobile communications Association (GSMA), such as an International Mobile Subscriber Identity (IMSI) number range. For example, an extended client-side application programming interface (API) can provide for identification of the end-user device, and when the device ID indicates an enhanced device type, the eSIM management framework can provide an extended profile that is better matched to the uses of the end-user device. This can provide a better user experience and/or reduce unnecessary costs from serving a more extensive profile than would be useful for the particular device. More specifically, for example, an existing profile for an iPhone5 may not provide full services to an iPhone8, which would reduce customer experience; whereas the same existing profile for an iPhone5 would still be more costly than a minimal profile, such as a machine-to-machine (M2M) profile for a parking meter. In various examples, when provided variables include an IMSI range, a profile can be provided to different partners based at least in part on the IMSI range value. In some examples, there can be similar profiles that differ for IMSI ranges to shunt traffic from one part of the Mobile Network Operator (MNO) core network to another part of the network.

As used herein, a client can represent an end-user device, an enterprise-level end-point device, and/or a partner device. The system can create and update profiles based on user input. The system can provide greater flexibility and customization for a variety of network connected devices.

As used herein, a mobile virtual network operator (MVNO) is an operator that does not have its own network and instead purchases bulk minutes or data bandwidth at wholesale rates from an MNO, which the MVNO resells under the MVNO's brand rather than the brand of the MNO. Examples of MNOs include Rogers, Telphonica, Vodaphone, Deutsche Telecom, T-Mobile, AT&T, Verizon, Sprint, etc. Examples of MVNOs include Tracfone, Google Project Fi, Ultra Mobile, Mint SIM, metroPCS, etc. As used herein a partner can represent an MVNO, an IoT service provider, an enterprise customer, etc.

To simplify and clarify explanation, the system is described below for use with a device connected to cellular data networks (e.g., mobile internet protocol, or "IP") and/or cellular voice networks. Principles of an eSIM management framework and system as described herein could also be used for other types of networks such as, for example, cable, digital subscriber line (DSL), and/or fiber IP networks. Thus, the system can be used anytime a device needs one or more profiles to connect to a network.

Electronic Subscriber Identity Module (eSIM) is an industry standard whereby a profile from a carrier, such as a mobile network operator (MNO), can be securely downloaded to an embedded or removable subscriber identification module (SIM) card. A SIM card enables an end-point (e.g., cell phone, smart meter, etc.) to access the MNO's network and access network functions such as voice, messaging and data. The conventional approach is to follow the industry standard, that is to pre-create and pre-load two types of profiles on the network catering to the aforementioned two broad categories of devices, namely M2M (smart meters, sensors, pet trackers, etc.) and consumer (smartphones, tablet computers, etc.).

Once these two conventional profiles are defined, access is controlled by provisioning appropriate functions on the network nodes. An end-point such as a smart-meter, for example, may be given an M2M profile that only enables data and SMS functions on the network. A consumer device such as, for example, a cell phone, smart phone, or tablet computer, on the other hand, may be enabled to access voice, messaging, and data on the network.

An end-point that is programmable or whose functions can be changed via a software upgrade or user input, for example, can utilize a more flexible approach to profile selection. In other words, the device itself can inform the network that there was a change on the SIM or eSIM, e.g., the profile associated with the SIM or eSIM was deleted or disabled, or when additional, different, or lesser functionality is desired, etc. Traditionally, a user would have had to go to the service provider, i.e., a physical location associated with their MNO or MVNO, as the case may be, to make a change in how the SIM card was configured or to obtain a new SIM card to accommodate changes. If the service provider did not keep a sufficient supply of SIM cards with the desired type of profile on hand, the profile might not be available. With the system described herein, the MNO can provide more than the two basic profile types to provide further control over various functions. In addition, the MNO can to update profiles dynamically in response to changes on the device. The system can provide this functionality for the service provider MNO, for other MNOs, for MVNOs, and/or for other $3^{rd}$ parties. Moreover, while the system can host multiple profiles for the service provider MNO, other MNOs, MVNOs, and/or for 3rd parties, the system can provide authentication for each of these entities to access only its respective profiles.

Unlike any known previous system, the system described herein can support multiple SIM profile platforms independent of the clients needing to know where they are actually requesting profiles and even in the absence of the GSMA. GSMA has the concept of requiring registration of each profile at a central location, but no such central location currently exists. The system described herein allows a service provider to provide a centralized framework rather than requiring the undefined registration of GSMA. The system described herein includes a centralized framework, eSIM management framework, as an abstraction layer, and those who want to consume a service need not know where their profile is set up or from—it could be a first specific profile from one vendor, a second specific profile from another vendor, etc. There can be two completely different systems, and when a client asks for a profile of a certain type, the eSIM management framework can determine how to serve up the profile, whether from a single vendor that is used consistently for that type of profile or from multiple vendors based on load balancing or other business logic. The entity that needs the profile need not be concerned with the source of the profile.

In some examples, an MNO can order batches of SIMs and/or eSIMs, but rather than the conventional process of loading their profiles on the network to sit idle until used, the MNO can load the profile on the network via the eSIM management framework just when needed, i.e., just-in-time (JIT).

In some examples, rather than ordering batches or SIMs and/or eSIMs, an MNO can use its own security modules to generate its own profiles as needed, load the generated profiles on the network, and activate the loaded profiles on demand.

An end-point device (e.g., an IOT, or a consumer device such as a smart phone) may be provided from the manufacturer, a vendor, the MNO, MVNO, and/or an enterprise to the user with no profile, for example. This can enable the MNO, MVNO, or enterprise to stock a single phone of that type, for example, rather than stocking multiple phones with different profiles. When received, the end-user can then select from a set of available capabilities of the device which are then communicated to the MNO. Because the MNO has a has access to create customized profiles, rather than just accessing the two conventional types of profiles, in some examples the MNO can then match device capabilities and/or the set of selected end-user preferences with settings for a customized profile to suit the particular needs of the end-point device. The created profile can then be downloaded on demand to the end-point device to activate the end-point device on the network.

As shown in FIG. 1, the environment 100 can comprise a plurality of different end-point devices 102 (also referred to as an end-point 102), a number of partners 104, an eSIM management framework 106, an aggregator or hub provider 108, potentially other MNOs 110. The system can connect to a number of eUICC Manufacturers (EUMs) 112. As discussed above, an end-point 102 can represent any of a variety of network enabled devices such as, for example, a cell phone, smart phone 102(1), tablet computer 102(2), laptop computer, smart watch, etc. The end-point 102 can also include a number of other network enabled devices such as, for example, utility meters 102(3), parking meters 102(4), automobiles 102(N), thermostats, washing machines, etc. (members of the so-called, "Internet of Things"). Indeed, the end-point 102 can represent any device capable of connecting to any type of network—e.g., cellular networks, IP networks, Wi-Fi connections, Bluetooth®, etc.

The end-point 102 can also include a SIM or eSIM 114. The SIM or eSIM 114 can comprise an embedded or removable SIM and can be remotely configurable via the eSIM management framework 106. The SIM or eSIM 114 includes various pieces of information (e.g., the international mobile subscriber identity, or IMSI) that enables the end-point to access the MNO's network. In some examples, the SIM or eSIM 114 can include multiple profiles 116 with different profile attributes. So, for example, a first profile 116a may enable the end-point to access text messaging or use data for wi-fi messaging only, while a second profile 116b may enable the end-point to access voice services, text messaging, and full data capabilities. In this manner, if the user wishes to change the capabilities of the end-point 102, for example, the first profile 116a can be swapped for the second profile 116b, or vice-versa, without the need to download an additional profile from the eSIM management framework 106.

The environment 100 can include the eSIM management framework 106. In FIG. 1, the eSIM management framework 106 is shown separate from partner(s) 104, which is one possible configuration. In various examples, the eSIM management framework 106 can include one or more "back-end" devices, which can include a cloud storage device, or other remote server. In some examples, the eSIM management framework 106 could also be incorporated in devices of one or more partners 104.

In examples, the eSIM management framework 106 can include one or more "back-end" devices of an aggregator or hub provider 108, which can be associated with a collection of one or more MNO(s) 110. A conventional aggregators or hub provider is an independent entity that hosts profiles for a group, e.g., 3-4, operators without knowledge of how the profiles are being used. The eSIM management framework 106 can provide security for user authentication by interfacing with conventional aggregators or hub providers 108 or more advanced aggregators or hub providers 108 without releasing profile information from the eSIM management framework 106 data center. As mentioned above, eSIM is an industry standard whereby a profile can be securely downloaded to an embedded or removable SIM card such as SIM or eSIM 114 so that an end-point 102 can access a network associated with an MNO 110 and access network functions such as voice, messaging and data. The eSIM management framework 106 can also enable dynamic profile updates to add or remove features available to the end-point 102. In various examples, the eSIM management framework 106 can provide a common abstraction layer to partner(s) 104 for eSIM operations including one or more of downloading, enabling, disabling, creating, and/or deleting one or more profiles. In examples, the eSIM management framework can broker connectivity to underlying eSIM vendors or eUICC manufacturers, e.g., EUM(s) 112.

In examples, the eSIM management framework 106 can maintain a system record of eSIM profiles processed through the eSIM management framework 106 layer. From the data the eSIM management framework 106 can extract SIM cycle metrics including business metrics for reporting related to the SIM cycle to monetize application programming interfaces (APIs) with clients, MVNOs, partners, etc. who need the profiles. From the data the eSIM management framework 106 can also provide a streamlined settlement of transactions with SIM vendors and/or EUMs 112.

The eSIM management framework 106 recording the SIM state can provide greater inventory control of usage of SIM profiles 116 and allow MNOs 110 and partners 104 to optimize their ordering systems. The eSIM management framework 106 can support JIT ordering and/or creation of profiles 116 including loading a profile 116 on the network at the time it is needed. The eSIM management framework 106 can provide for automation of client and/or customer device activation and management rather than requiring ordering profiles in bulk so that many of those profiles (e.g., tens of thousands) sit idle—not in use, sometimes for more than a year as happens conventionally. Thus, the eSIM management framework 106 system described herein can present a significant reduction in the use of network memory. Conventionally, network memory is quite expensive because it is real time, site redundant, and geo redundant, and maintaining such network memory for inactive SIM and eSIM profiles requires a significant amount of network bandwidth. The eSIM management framework 106 can accept a request for an eSIM, create the profile for the eSIM, load the eSIM profile into the network memory, and within a short time, e.g., 1-5 minutes, the profile 116 can be ready and the user can access the network via an end-user device 102 with the profile 116.

The eSIM management framework 106 can interface with any number of MNOs' billing and rating engines 118 to provide transactional level details per partner 104 for settlement. For example, on behalf of a customer, the eSIM management framework 106 can tell a billing system and a customer service system that a customer is no longer active, to avoid billing an inactive customer and/or to identify if the customer has a service or technical problem, and the eSIM management framework 106 can orchestrate downloading a new profile 116 or re-downloading a profile 116 associated with a previous SIM 114, eSIM, or integrated circuit card identification (ICCID), and reactivating service for the customer. In contrast, the GSMA recommendation is merely to notify the profile provider if the user deletes the profile. Thus, the eSIM management framework 106 extends conventional capabilities according to the GSMA.

Rather than a profile repository that stores a database of inactive profiles such as on a server, a cloud storage device, or other remote server associated with a partner 104, hub provider 108, or other MNO 110, as discussed below, the eSIM management framework 106 can compare criteria for a profile requested by a partner 104 or end device 102, for example, to criteria of known profiles and generate a profile that includes at least the functions in the requested profile 116.

The environment 100 can also include one or more EUM 112. The EUM 112 can prepare, encrypt, and send the profiles 116 to the eSIM management framework 106. The EUM 112 can receive a profile request from the eSIM management framework 106. In some examples, as shown the EUM 112 can include one or more units for subscription manager data preparation (SM-DP) 122. Units for subscription manager data preparation (SM-DP) 122 can include M2M subscription manager data preparation (SM-DP) 122a, consumer subscription manager data preparation (SM-DP) 122b, and/or a subscription manager secure routing (SM-SR) 122c. The SM-DP 122a and/or SM-DP 122b, on demand, can securely create and encrypt profiles 116 and can securely forward the profiles to the eSIM management framework 106 for installation into a SIM or eSIM 114. In some examples, on demand the any of the SM-DPs 122 can securely create and encrypt profiles 116 and can securely install the profiles 116 into the SIM or eSIM 114. To this end, the SM-DPs 122 can securely package profiles 116 to be provisioned on the SIM or eSIM 114 using, for example, any known profile package format specified by the GSMA. The SM-DPs 122 can also manage the installation of these profiles 116 onto the SIM or eSIM 114. In addition, a procedure between the MNO and the SM-DPs 122 managed by the eSIM management framework 106 can allow a profile 116 previously downloaded and installed on the SIM or eSIM 114 to be enabled on the MNO's network.

The SM-SR 122c enables the secure download, enablement, disablement and deletion of profiles 116 on the SIM or eSIM 114. Thus, the SM-SR 122c ensures the secure transport of both SIM platform and SIM profile management commands to load, enable, disable, and delete profiles 116 on the SIM or eSIM 114.

In some examples, the environment 100 may also receive inputs from a rate/billing engine 118. The rate/billing engine 118 can be associated with the eSIM management framework 106 and can provide input as to whether, for example, a user's account includes the features requested for the end-point 102. If a SIM Management Application (SMA) requests a profile 116 that enables a user's pet tracker to receive text messages, for example, but the user's account does not include text messaging, the eSIM management framework 106 can generate an error message, prompt the user to upgrade their account, or take other actions.

The eSIM management framework 106 can also be connected directly, or indirectly, to the MNO core network 120. The MNO core network 120 represents the central portion of the MNO's network and can provide access to cellular and IP services. A cellular connected end-point 102 may be connected to a cell tower, for example, which can be connected to the MNO core network 120 via, for example, one or more fiber optic connections, microwave backhauls, switching centers, etc. An IP connected end-point 102 may be connected, for example, through a wireless (e.g., Wi-Fi) connection, to a cable internet service provider (ISP), and ultimately to the Internet.

In some examples, the environment 100 can enable any of the various end-points 102 (e.g., a cell phone, a smart phone, a tablet computer, a desktop computer, a smart meter, a parking meter, an automobile, or other network enabled device) to be shipped with no profile. The MNO may want to match end-point 102 capabilities and/or the set of selected end-user preferences with profiles 116 stored in a profile repository (not shown). The eSIM management framework 106 can select the best profile 116 based on the particular needs of the end-point 102 or end-user and then download the profile 116 to the SIM or eSIM 114 on the end-point 102.

In some examples, the eSIM management framework 106 can enable the MNO to sell a basic universal plan to the customer at the point of sale, and then give users the freedom to acquire or remove services according to their needs and the capabilities of the end-point, for example, after switching devices, or acquiring new network enabled devices.

Figure 2:
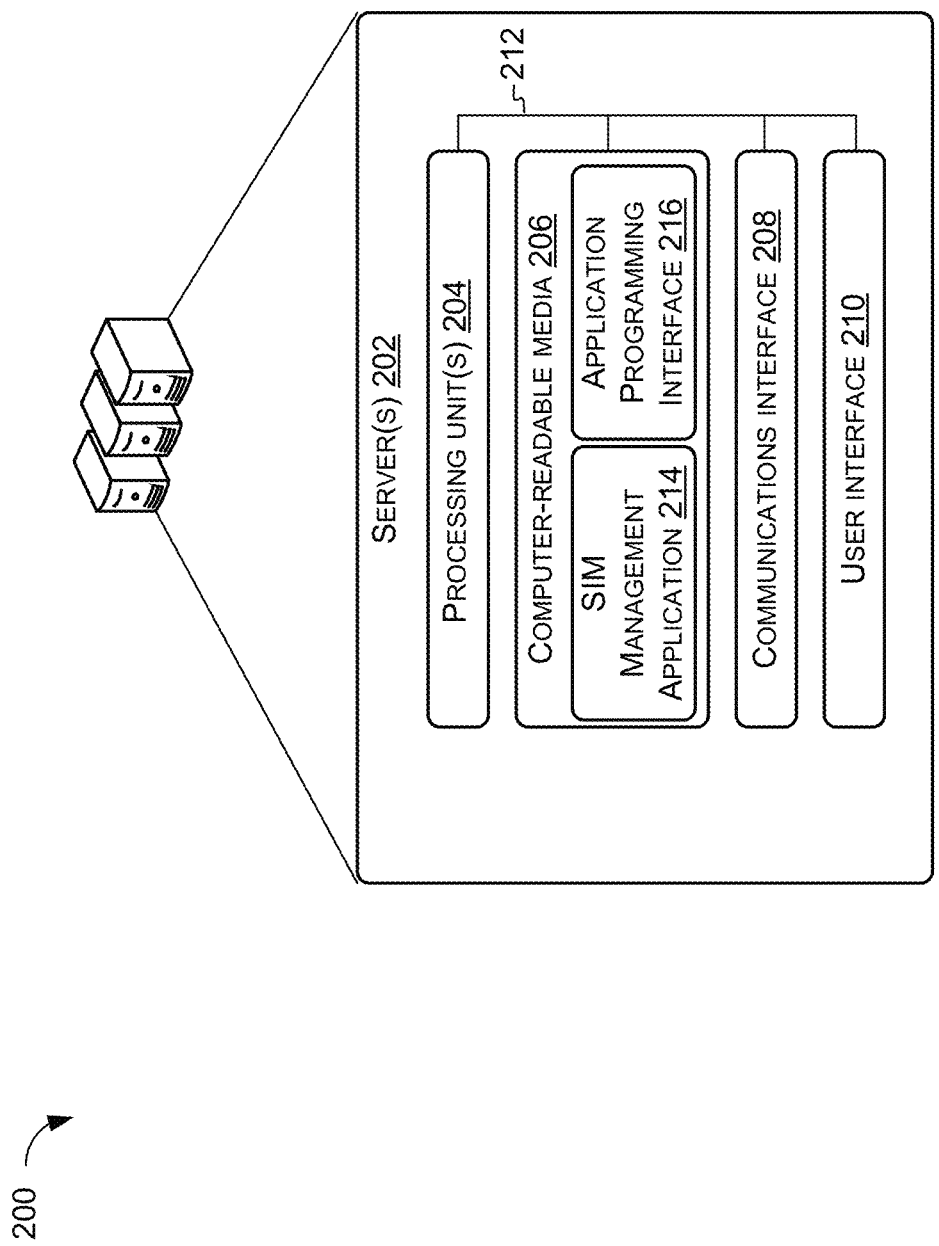
FIG. 2 depicts an example of a computing device of the eSIM management framework, according to some examples described herein.

FIG. 2 depicts an example of an eSIM Management Framework 200, such as the eSIM management framework 106, and more particularly a cloud service implementation including an example server computing device 202 of the eSIM management framework for improved eSIM profile management, according to examples described herein.

Details of an example server 202 can be representative of others of server(s) 202. However, each of the server(s) 202 can include additional or alternative hardware and/or software components. The illustrated server 202 can include one or more processing unit(s) 204 operably connected to one or more computer-readable media 206, a communications interface 208, and a user interface 210, such as via a bus 212.

Processing unit(s) 204 can represent one or more of a variety of processing devices including, for example, single-core processors and/or multi-core processors, microprocessors, microcontrollers, CPU-type processing devices, GPU-type processing devices, field-programmable gate arrays (FPGAs), other classes of digital signal processors (DSPs), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), programmable logic devices (PLDs), programmable logic arrays (PLAs), programmable array logic devices (PALs), and other types of customizable processors. For example, a processing unit 204 can represent a hybrid device, such as a device from ALTERA and/or XILINX that includes a CPU core embedded in an FPGA fabric. In some examples, processing unit(s) 204 can include and/or be connected to computer-readable media 206, e.g., a memory such as a RAM and/or cache. In some instances processing unit(s) 204 can include processors representing software per se. As used herein, processing devices do not include processors representing software per se.

Computer-readable media 206 can be or include tangible computer-readable media. Tangible computer-readable media includes, but is not limited to, RAM, ROM, EEPROM, flash memory or other memory technology, CD ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processing unit(s) 204. Tangible computer-readable media can include volatile and nonvolatile, removable and non-removable media implemented in any method or technology for storage of information, such as computer readable instructions, data structures, program modules, or other data. Computer-readable media 206 can also include computer-readable signals such as transitory or propagating signals. As used herein, tangible computer-readable media does not include computer-readable signals not embodied in tangible computer-readable media.

The computer-readable media 206 can be used to store data and to store instructions that are executable by the processing unit(s) 204 to perform various functions as described herein. The computer-readable media 206 can store various types of instructions and data, such as an operating system, device drivers, etc. The processor-executable instructions can be executed by the processing unit(s) 204 to perform the various functions described herein.

In some examples, the computer-readable media 206 can include a SIM management application (SMA) 214. In various examples, the eSIM management framework 106 can include an application program interface (API) 216 to enable communications between partner(s) 104 and the eSIM management framework 106, 200 and/or between the end-point(s) 102 and eSIM management framework 106, 200 as well as to facilitate eSIM management and provisioning as discussed below with reference to FIGS. 3, 4, and 5. In some examples, the API 216 is a java-based solution and can include a JSON interface, making it lightweight and adaptable. The APIs can be adapted and extended based on the use case and the partner being integrated.

Server(s) 202 can also include one or more communications interfaces 208 connected via the bus 212 to processing unit(s) 204 to enable wired and/or wireless communications between server(s) 202 and endpoints including one or more partners 104 or end-point device(s) 102 as shown in FIG. 1, and/or other computing device(s). Such communications interface(s) 208 can include one or more transceiver devices, e.g., network interface controllers (NICs) such as Ethernet NICs and/or other types of transceiver devices, to send and receive communications over a network. The processing unit(s) 204 can exchange data through respective communications interface(s) 208. In some examples, the communications interface(s) 208 can include a PCI Express (PCIe) transceiver, and the network can include a PCIe bus. In some examples, the communications interface 208 can include, but is not limited to, a transceiver for cellular (3G, 4G, 5G, LTE, and/or other), WI-FI, Ultra-wideband (UWB), BLUETOOTH, and/or satellite transmissions. The communications interface(s) 208 can include a wired I/O interface, such as an Ethernet interface, a serial interface, a Universal Serial Bus (USB) interface, an INFINIBAND interface, and/or other wired interfaces. In some examples, the communications interface(s) 208 can facilitate communication performed using other technologies, such as wired (Plain Old Telephone Service, POTS, or PSTN lines), optical (e.g., Synchronous Optical NETwork, SONET) technologies, and the like. In various examples, the communications interface 208 can additionally and/or alternatively include hardwired interfaces such as 0-20 mA control lines.

The eSIM management framework 106, 200 can interface with other network components not shown in FIG. 1, such as a home location register (HLR) and/or a home subscriber server (HSS) to query subscriber state, e.g., query registration state, query last known location, update location, etc. In various examples, the eSIM management framework 106, 200 can instruct EUMs 112 to download specific profiles based on HLR and/or HSS information. The eSIM management framework 106, 200 can interface with other MNOs' aggregators and/or hub providers 108 to facilitate download of profiles specific to the respective MNOs, facilitate activation of profiles specific to the respective MNOs, or provide information regarding the state of their respective profiles.

In some examples, the eSIM management framework 106, 200 can use current location information for an end-user device to identify an appropriate HLR and/or HSS. In various examples, the eSIM management framework 106, 200 can use current location information for an end-point device to temporarily override a previously identified HLR and/or HSS for cost savings or network efficiency. For example, an MNO based in the US may have an agreement with a non-US based MNO, that is an MNO based in another country or region, and when a location of an end-user device of the US-based MNO is identified in the other country, the eSIM management framework 106, 200 can load a profile for the non-US-based MNO, e.g., temporarily, on the endpoint device. This can benefit the home MNO and the consumer by reducing roaming charges that otherwise would have been incurred.

The eSIM management framework 106, 200 can serve as a notification engine to more than one end point for the life cycle. In various examples, the end point can include one or more of a billing support system 118 or an MNO core network 120 as shown in FIG. 1, alternative networks, and/or 3' parties, etc. The eSIM management framework 106, 200 can be an intelligent layer that can provide reporting and accept polling from network assets such as HLRs or other network entities or partners 104 as shown in FIG. 1 for decision making, e.g., to inform algorithm modification and/or take other actions. For example, the eSIM management framework 106, 200 can provide an MNO visibility of how many profiles a partner is downloading via the API 216, how many profiles are currently in use, and how the profiles are being used. The eSIM management framework 106, 200 can provide a 360-degree view for an MNO relative to a particular partner or group of partners regarding profile type, bandwidth use, revenue, etc.

The eSIM management framework 106, 200 can perform brokering between a plurality of EUM(s), such as EUM(s) 112 shown in FIG. 1. In examples, EUM(s) 112 can each host machine-to-machine (M2M) profiles, and brokering can be between EUM(s) hosting M2M profiles. Also, The EUM(s) 112 can each host consumer eSIM profiles, and brokering can be between EUM(s) hosting consumer profiles. In addition, some EUM(s) 112 can each M2M and consumer profiles, and brokering can be between EUM(s) hosting both M2M and consumer profiles. The eSIM management framework 106, 200 can determine which EUM 112 will serve a profile based on one or more characteristics and/or attributes of the requesting client, attributes of the external partner, and/or via another fashion such as round robin. Brokering can include directing requests from external partners between M2M EUMs and consumer EUMs, and brokering can include directing requests among M2M EUMs and consumer EUMs.

The eSIM management framework 106, 200 can optimize SIM and eSIM ordering. In the eSIM process, the eSIM management framework 106, 200 allows for network information to be loaded into secure relational databases, which is less costly that the conventional approach, and OTA and Data Preparation Platform (DP or DP+) can be combined to improve efficiency. In various examples, the eSIM management framework 106, 200 can act as an activation platform and the SMA 214 can request a profile. The eSIM management framework 106, 200 can call the appropriate DP+ for ICCID assignment, and the corresponding ICCID's details can be loaded into real-time memory network database. If the network contains multiple networks, e.g., with different access types such as LTE, 5G, 4G, narrow band-internet of things (NB-IOT), the eSIM management framework 106 can choose appropriate nodes onto which to load the profiles. For example, the authentication details can be loaded to the AUC, and the HLR and/or HSS can be loaded with minimal subscription data. Then, the ICCID control can be returned to the eSIM management framework 106, 200, and network activation can proceed.

The eSIM management framework 106 can provide improvements for capacity planning A SIM Management Application (SMA) 214 can request a profile 116 to enables a user's pet tracker to receive text messages, for example, and if the user's account does not include text messaging, the eSIM management framework 106, 200 and/or the SMA 214 can generate an error message, can generate a message to prompt the user to upgrade their account, or take other actions. In various examples, an eUICC profile delete event can notify the DP+, which can be published to the SMA 214, for the SMA 214 to act upon. If the profile is not to be reused, the SMA 214 can delete the ICCID data from the network databases and mark it as unavailable in DP+ and the secure relational database. If the profile is to be reused, the SMA 214 can mark it as available in DP+ and the secure relational database, and the profile can be reassigned to a new user. If these profiles are tagged as bootstrap, they can be assigned to future cards that require profiles for the specific purpose of activation. In some examples, the eSIM management framework 106, 200 facilitates foregoing ordering profiles from SIM card vendors, and the eSIM management framework 106, 200 can generate profiles in real time.

As mentioned above, in some examples, rather than having the standard two profiles (consumer and M2M), the eSIM management framework 106 can create a plurality of profiles 116, each catered to a specific group of functions such that each function is associated with an attribute of a profile 116. This can enable generating and loading of appropriate profiles.

The server 202 can further include a user interface (UI) 210 associated with the server 202 such as via an electronic display device, a speaker, a vibration unit, a touchscreen, or other devices for presenting information to a user and receiving commands from the user. The user interface 210 or components thereof, can be separate from the server 202 or integrated with the server 202.

A bus 212 of server 202 can operably connect one or more processing unit(s) 204, one or more computer-readable media 206, a communications interface 208, and a user interface 210. Bus 212 can include one or more of a Peripheral Component Interconnect (PCI) bus, a Mini-PCI bus, an Express (PCIe) bus, a system bus, a data bus, an address bus, and any variety of local, peripheral, and/or independent buses, and/or any combination thereof. In some examples, multiple processing unit(s) 204 can exchange data through an internal interface bus (e.g., PCIe), rather than and/or in addition to over a network. While the processing unit(s) 204 are described as residing on the server 202, in this example, the processing unit(s) 204 can also reside on different server(s) 202 in some examples. In some examples, at least two of the processing unit(s) 204 can reside on different server(s) 202. In such examples, multiple processing unit(s) 204 on the same server 202 can use a bus 212 of the server 202 to exchange data, while processing unit(s) 204 on different server(s) 202 can exchange data over network(s).

Figure 3:
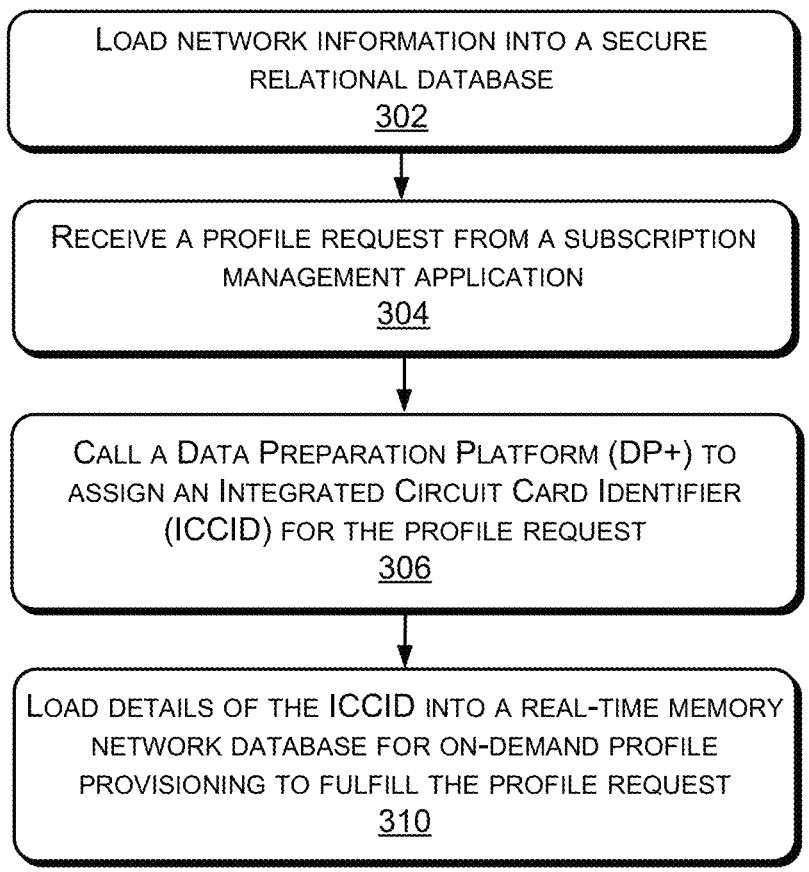
FIG. 3 depicts an example process of eSIM profile management to reduce consumption of network resources, according to some examples described herein.

FIG. 3 depicts an example process 300 of eSIM profile management to reduce consumption of network resources that can be implemented in a system including the eSIM Management Framework 106, 200.

At 302, the method 300 can include loading network information into a secure relational database. As mentioned above, this loading can be performed by the eSIM management framework 106, 200. In some examples, the eSIM management framework 106, 200 can receive a list or group of profiles associated with SIMs or eSIMs for loading as network information into a secure relational database. In some examples, the eSIM management framework 106, 200 can determine whether the network includes a plurality of networks separated by access types. In some examples, the eSIM management framework 106, 200 can load an Authentication and Cyphering (AUC) database associated with the eSIM management framework 106 with authentication details for a profile as part of the network information. In some examples, the eSIM management framework 106, 200 can load an HLR and/or HSS with at least partial subscription data for a profile.

At 304, the method 300 can include receiving a profile request from SMA 214. In some examples, the eSIM management framework 106, 200 is configured to accept profile requests from a plurality of providers, which can include one or more of an MNO associated with the eSIM management framework 106, other MNOs, partners, other MVNOs, and/or other 3' parties.

At 306, the method 300 can include calling a Data Preparation Platform (DP+) to assign an Integrated Circuit Card Identifier (ICCID) for the profile request. In various examples, the eSIM management framework 106, 200 can identify or receive an International Mobile Subscriber Identity (IMSI) range of an end-point device. The eSIM management framework 106, 200 can provide the profile based at least in part on the IMSI range and/or provide for routing network traffic according to the IMSI range. In some examples the eSIM management framework 106, 200 can generate a profile for association with an eSIM for real-time loading as part of the network information. In some examples the eSIM management framework 106, 200 can identify an appropriate node or end point of a network of a plurality of networks on which to load a profile.

At 308, the method 300 can include loading details of the ICCID into a real-time memory network database for on-demand profile provisioning to fulfill the profile request. In some examples, the eSIM management framework 106, 200 can cause a profile to be loaded on to an appropriate node or end point of a network.

Figure 4:
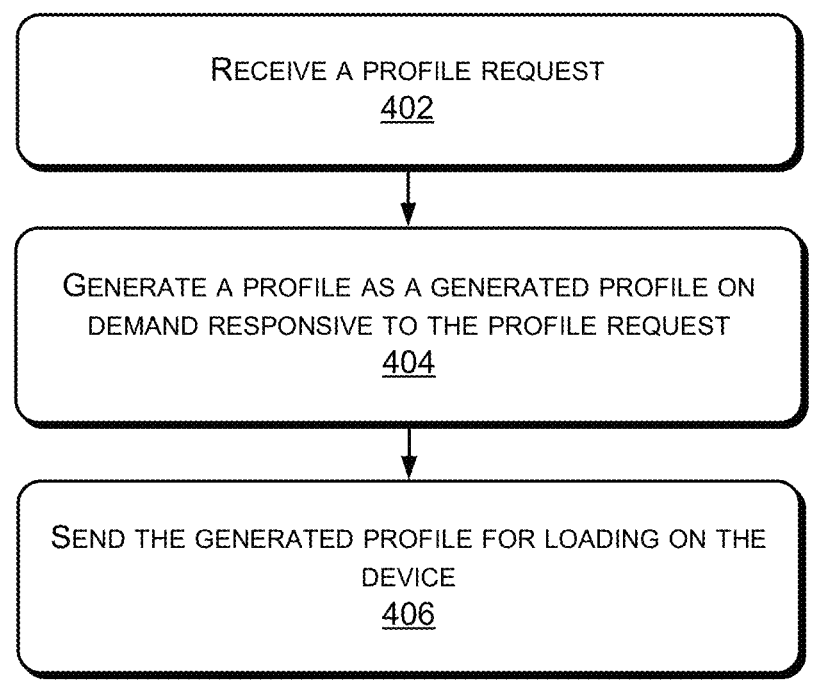
FIG. 4 depicts an example process of operation of an eSIM management framework, according to some examples described herein.

FIG. 4 depicts an example process 400 of operation of an eSIM management framework 106, 200 according to some examples described herein.

At 402, the method 400 can include an eSIM management framework 106, 200 receiving a profile request. In some examples, the profile request can omit at least one variable from the Global Standard for Mobile Association (GSMA) standard. In some examples, the profile request can include an International Mobile Subscriber Identity (IMSI) number.

At 404, the method 400 can include the eSIM management framework 106, 200 generating a profile as a generated profile on demand responsive to the profile request. In some examples, when the profile request omits a variable from the GSMA standard, the method includes the eSIM management framework 106, 200 generating a profile based on alternate information and/or default information as described above. In some examples, the method 400 can include the eSIM management framework 106, 200 providing or serving as an abstraction layer to access eSIM operations comprising at least one of: download profile, enable profile, disable profile, or delete profile. In some examples, the method 400 can include the eSIM management framework 106, 200 maintaining a state of record of the generated profile. In some examples, the method 400 can include the eSIM management framework 106, 200 interfacing with a billing engine of a Mobile Network Operator (MNO) to provide transactional-level details per partner for settlement. In some examples, the method 400 can include the eSIM management framework 106, 200 interfacing with an HLR and/or HSS to identify subscriber state, and the eSIM management framework 106, 200 sending an instruction to an embedded Universal Integrated Circuit Card (eUICC) manufacturer (EUM) to download a specific profile according to the subscriber state, which in various instances can include one or more of a registration state, a subscription state, or a location of last known update.

In some examples, the method 400 can include the eSIM management framework 106, 200 facilitating at least one of Subscriber Identity Module (SIM) or electronic Subscriber Identity Module (eSIM) sourcing from multiple SIM or eSIM vendors. In some examples, the method 400 can include the eSIM management framework 106, 200 brokering connectivity to at least one of an eSIM vendor or an embedded Universal Integrated Circuit Card (eUICC) manufacturer (EUM). In some examples, the brokering includes identifying at least two EUM that host machine-to-machine profiles and assigning the EUM to serve the profile based at least on an attribute of the requestor. In some examples, the method 400 can include the eSIM management framework 106, 200 identifying at least two EUMs, a first EUM that hosts machine-to-machine profiles and a second EUM that hosts consumer eSIM profiles, and the eSIM management framework 106 assigning the EUM to serve the profile based at least on an attribute of the requestor.

At 406, the method 400 can include the eSIM management framework 106, 200 sending the generated profile for loading on a device.

Figure 5:
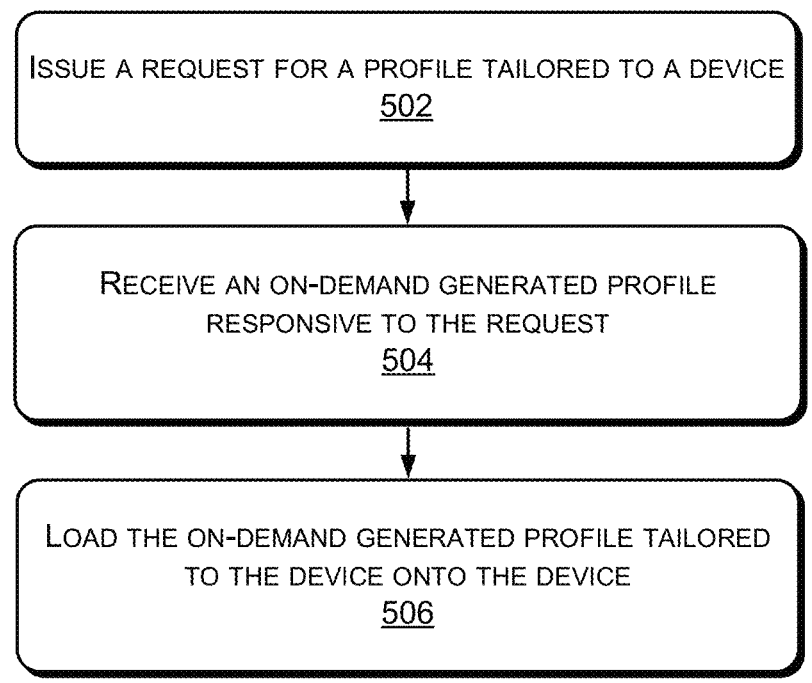
FIG. 5 depicts an example process of client-side profile provisioning in an environment including an eSIM management framework, according to some examples described herein.

FIG. 5 depicts an example process 500 of client-side profile provisioning in an environment including an eSIM management framework, according to some examples described herein.

At 502, the method 500 can include an end-point issuing a request for a profile tailored to a device. In various examples, the end-point can represent a partner, an entity of an MNO operating the eSIM management framework 106, 200, another MNO, an MVNO, another entity, and/or an end-point device of any of the afore-mentioned entities.

At 504, the method 500 can include the requesting end-point receiving an on-demand generated profile responsive to the request. In various examples, an eSIM management framework 106, 200 can manage on-demand generation of the generated profile as described above.

At 506, the method 500 can include the end-point loading the on-demand generated profile tailored to the device onto the device.

FIGS. 3, 4, and 5 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more tangible computer-readable media that, when executed by one or more processors, perform the recited operations. Generally, computer-executable instructions include routines, programs, objects, components, data structures, and the like that perform particular functions or implement particular abstract data types. The order in which the operations are described should not be construed as a limitation, and any number of the described blocks can be combined in any order and/or in parallel to implement the processes.

While several possible examples are disclosed above, examples of the present disclosure are not so limited. In addition, the location and configuration used for various features of examples of the present disclosure such as, for example, the order of the steps used, the components and layout of network components, and other features can be varied according to a particular end-point or communications network, among other things. Such changes are intended to be embraced within the scope of this disclosure.

The specific configurations and machines can be varied according to particular design specifications or constraints requiring a system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
one or more processors; and
one or more instructions executable by the one or more processors to perform operations comprising:
receiving profiles associated with Subscriber Identity Modules (SIMs) or electronic Subscriber Identity Modules (eSIMs) and downloaded to end-point devices by telecommunications network operators;
loading the profiles as network information into a secure relational database;
providing metrics relating to the profiles to one or more of the telecommunications network operators;
receiving an initial profile request for an initial profile for an end-point device via one of the telecommunications network operators, the initial profile being configured to provision the end-point device to be activated on a communications network of the one of the telecommunications network operators, the initial profile request comprising data derived from the end-point device and specifying capabilities or user preferences for the end-point device;
comparing the capabilities or user preferences for the end-point device to the network information in the secure relational database;
selecting an exemplary profile from the secure relational database based at least in part on the capabilities or user preferences for the end-point device;
brokering connectivity to one of a plurality of Universal Integrated Circuit Card (eUICC) manufacturers (EUMs) for generating the initial profile based, at least in part, on the exemplary profile; and
downloading the initial profile to the end-point device for on-demand profile provisioning.

2. A system as claim 1 recites, wherein providing metrics relating to the profiles comprises providing inventory data relating of usage of the profiles to one or more of the telecommunications network operators.

3. A system as claim 1 recites, the one or more instructions executable by the one or more processors to perform operations further comprising:
identifying an International Mobile Subscriber Identity (IMSI) range associated with the end-point device; and
generating the initial profile according to the IMSI range.

4. A system as claim 1 recites, the one or more instructions executable by the one or more processors to perform operations further comprising:
identifying an International Mobile Subscriber Identity (IMSI) range of the end-point device; and
selecting the exemplary profile based at least in part on the IMSI range.

5. A system as claim 1 recites, the one or more instructions executable by the one or more processors to perform operations further comprising:
- determining that a network includes a plurality of networks separated by access types;
- identifying, based at least on an access type of the access types, an appropriate node of a network of the plurality of networks on which to load the initial profile to fulfill the initial profile request; and
- loading the initial profile onto the appropriate node.

6. A system as claim 1 recites, the one or more instructions executable by the one or more processors to perform operations further comprising loading an Authentication and Cyphering (AUC) database with authentication details for the initial profile as part of the network information.

7. A system as claim 1 recites, the one or more instructions executable by the one or more processors to perform operations further comprising loading a Home Location Register (HLR) or a Home Subscriber Server (HSS) with at least partial subscription data for the initial profile.

8. A method comprising:
- receiving profiles associated with Subscriber Identity Modules (SIMs) or electronic Subscriber Identity Modules (eSIMs) and downloaded to end-point devices by telecommunications network operators;
- providing metrics relating to the profiles to one or more of the telecommunications network operators;
- receiving, from a requestor via one of the telecommunications network operators, an initial profile request for an initial profile configured to provision a user equipment (UE) to be activated on a communications network of the one of the telecommunications operators, the initial profile request comprising data derived from the UE and specifying enhanced capabilities or user preferences for the UE;
- comparing the enhanced capabilities or user preferences for the UE to the profiles;
- selecting one of a plurality of Universal Integrated Circuit Card (eUICC) manufacturers (EUMs) to generate the initial profile based, at least in part, on an attribute of the requestor; and
- requesting the one or the plurality of EUMs to generate and download the initial profile as a generated profile on demand responsive to the initial profile request, the generated profile on demand matching the enhanced capabilities or the user preferences.

9. A method as claim 8 recites, wherein the initial profile request specifies the enhanced capabilities for the UE by providing a device identification for the UE representing an enhanced device type.

10. A method as claim 8 recites, wherein the initial profile request includes an International Mobile Subscriber Identity (IMSI) number.

11. A method as claim 8 recites, further comprising facilitating at least one of SIM or eSIM sourcing from multiple SIM or eSIM vendors.

12. A method as claim 8 recites, further comprising enabling one or more of the telecommunications network operators to download an eSIM profile, enable an eSIM profile, disable an eSIM profile, or delete an eSIM profile.

13. A method as claim 8 recites, wherein the selecting further comprising brokering connectivity to at least one of an electronic Subscriber Identity Module (eSIM) vendor or an embedded Universal Integrated Circuit Card (eUICC) manufacturer.

14. A method as claim 13 recites, wherein the selecting further comprises identifying at least two EUMs that host machine-to-machine profiles.

15. A method as claim 13 recites, wherein the selecting further comprises
- identifying at least two EUMs, a first EUM that hosts machine-to-machine profiles and a second EUM that hosts consumer eSIM profiles.

16. A method as claim 9 recites, further comprising providing an application programming interface for receiving the device identification of the UE.

17. A method as claim 8 recites, further comprising interfacing with a billing engine of one or more of the telecommunications network operators to provide transactional-level details relating to the initial profile for settlement.

18. A method as claim 8 recites, further comprising:
- interfacing with a Home Location Register (HLR) Home Subscriber Server (HSS) to identify subscriber state; and
- sending an instruction to the one of the plurality of EUMs to generate and download the initial profile according to the subscriber state.

19. A method as claim 18 recites, wherein the subscriber state includes a location of last known update being within a roaming region for the one of the telecommunications network operators, further comprising downloading to the UE a temporary profile for the roaming region.

20. One or more non-transitory computer-readable storage media having instructions stored thereupon which are executable by one or more processors associated with a first service provider and which, when executed, cause the one or more processors to perform operations comprising:
- receiving profiles associated with Subscriber Identity Modules (SIMs) or electronic Subscriber Identity Modules (eSIMs) and downloaded to end-point devices by telecommunications network operators;
- loading the profiles as network information into a secure relational database;
- providing metrics relating to the profiles to one or more of the telecommunications network operators;
- receiving from one of the telecommunications network operators an initial profile request for an initial profile for an end-point device, the initial profile being configured to provision the end-point device to be activated on a communications network, the initial profile request comprising data derived from the end-point device and specifying operational characteristics for the end-point device;
- comparing the operational characteristics for the end-point device to the network information in the secure relational database;
- selecting a profile from the secure relational database corresponding to the operational characteristics; and
- downloading the profile to the end-point device for on-demand profile provisioning.

* * * * *